Oct. 25, 1955     E. P. SEXTON     2,721,579
FLEXIBLE DIAPHRAGM SUPPORT
Filed March 9, 1954
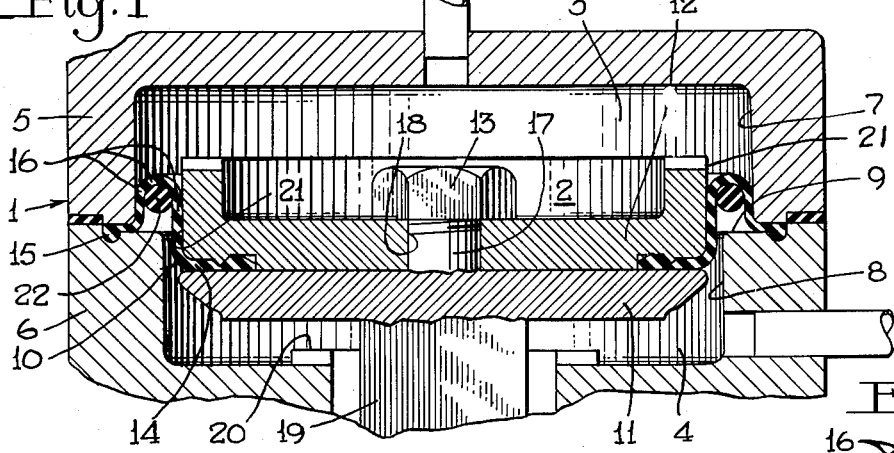
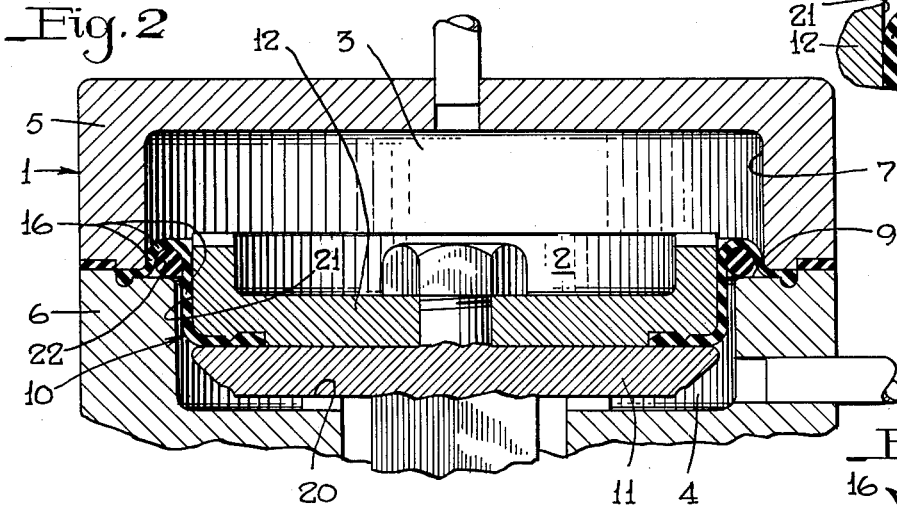
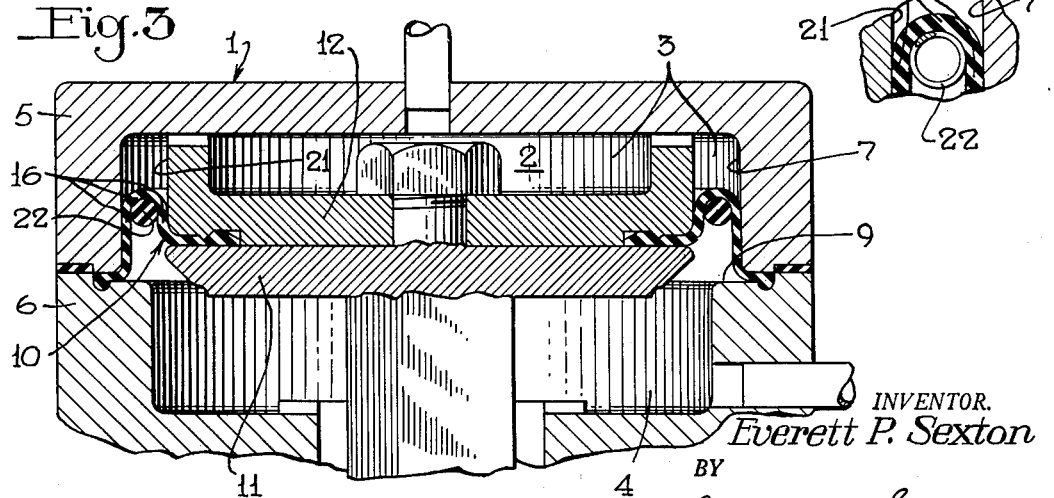
INVENTOR.
Everett P. Sexton
BY
Adelbert A. Steinmiller
ATTORNEY

United States Patent Office 2,721,579
Patented Oct. 25, 1955

2,721,579

FLEXIBLE DIAPHRAGM SUPPORT

Everett P. Sexton, East McKeesport, Pa., assignor to Westinghouse Air Brake Company, Wilmerding, Pa., a corporation of Pennsylvania Application March 9, 1954, Serial No. 415,043

6 Claims. (Cl. 137—788)

This invention relates to flexible diaphragm support means and more particularly to such means for supporting the fold in a long-travel double-acting diaphragm.

When the fold of a long-travel diaphragm is subjected to preponderance in pressure of fluid on its outer or convex face, such as when said diaphragm is double-acting, said fold tends to be collapsed by such pressure and distorted to the extent that freedom of movement of the diaphragm-follower assemblage may be jeopardized. It therefore becomes a prime object of this invention to provide means for preventing the collapse of the fold in a long-travel diaphragm when subjected to preponderance in pressure of fluid on its outer or convex face.

Other objects and advantages will become apparent from the following description of the invention taken in connection with the attached drawing in which:

Fig. 1 is a cross-sectional view of a portion of a fluid pressure actuator device embodying the invention; and Figs. 2 and 3 are similar views of such portion showing components of same in different opposite limit positions;

Fig. 4 is a cross-sectional view of a modified portion of the device shown in the preceding figures; and Fig. 5 is an alternate form of a supporting ring comprised in the structure shown in the preceding figures.

Description

Referring to Figs. 1, 2 and 3 in the drawing, the fluid pressure actuator device embodying the invention comprises a hollow cylindrical casing 1, and a diaphragm-follower assemblage 2 disposed within said casing and subject opposingly to pressure of fluid in pressure chambers 3 and 4 at its opposite sides.

The hollow casing 1 is divided and comprises two portions 5 and 6 having coaxially aligned cylinder walls 7 and 8, respectively, the former of greater diameter than the latter to provide for existence of an annular shoulder 9 at their junction.

The diaphragm-follower assemblage 2 comprises a flexible diaphragm 10, two circular follower members 11 and 12, and a nut 13.

The flexible diaphragm 10 comprises an inner annular flange portion 14 clamped between the diaphragm follower members 11 and 12 at their outer periphery for coaxial sealing attachment thereto, an outer annular flange portion 15 clamped between portions 5 and 6 of the casing 1 for coaxial sealing attachment thereto, and an intermediate integral travel fold portion 16 extending axially and radially between the outer and inner flange portions 14 and 15.

The follower member 11 is provided with a central threaded stud portion 17 which extends through a central opening 18 in follower member 12 to accommodate the nut 13 and obtain the clamping of diaphragm flange 14. The outer diameter of follower member 11 is less than the diameter of cylinder wall 8 to provide for clearance therebetween during axial movement of said follower member with deflection of the diaphragm. Follower member 11 is integrally attached at its center to one end of a follower stem 19 which is provided for operative connection at its opposite end (not shown) with means (not shown) to be actuated by the diaphragm-follower assemblage.

An annular shoulder 20 is formed in casing portion 6 within chamber 4 and in encirclement of stem 19 for abutting engagement with the follower member 11 to define the extent of movement of the diaphragm-follower assemblage 2 in the direction of chamber 4.

The diaphragm follower member 12, disposed in chamber 3, is provided with a cylindrical surface 21 at its outer periphery for back-up engagement with the radialwise inner portion of the diaphragm fold 16. Surface 21 extends axialwise in the direction of chamber 3 and is of sufficient length to provide radialwise support for the respective portion of the diaphragm fold 16 over its entire length for full travel of the follower members in either direction.

The actuator device is further provided with a flexible ring 22 of circular cross-section which is preferably composed of resilient material, although conceivably a coil spring of wire might serve the purpose intended, and preferably continuous, although one circumferential separation may not detract from its utility. According to the invention, the ring 22 is proportioned to nest in the trough of the fold 16 and is of sufficient size in cross-section as to cause the radialwise outer and inner layers of the fold 16 to be urged into radial engagement with the cylinder wall 7 and follower surface 21, respectively.

It is of primary importance also that the flexible ring 22 be capable of turning inside out without any material or variable resistive effort and without creation of any internal stresses while being turned inside out which would favor return to its original position. For this reason, if such ring is made of resilient material, as in its preferred form shown in the drawings, it should not be formed by a moulding process since then its inherent characteristics would tend to resist its being turned inside out and would bias such a ring in favor of return to its original state of formation; characteristics which are not to be desired in the ring 22 of the present invention for reasons which hereinafter will become apparent.

According to the present invention, therefore, when the ring 22 is composed of rubber, for example, it is preferably formed by joining together opposite ends of a length of rubber of circular cross-section which in a relaxed state without internal stresses is straight, so that when formed into the shape of a ring its inherent internal stresses will be such that such ring will not be biased against being turned inside out or biased in favor of return to its original position, it will remain continuously in a state of internal stress equilibrium during complete and successive rotations of extroversion.

Operation

In operation of the actuator device embodying the invention, assume that pressure of fluid in chambers 3 and 4 at opposite sides of the diaphragm-follower assemblage 2 is equalized and that such assemblage is in a position such as that in which it is shown in Fig. 1, with the diaphragm fold in a neutral position to accommodate travel of the follower members in either direction.

Assume now that pressure of fluid in chamber 3 is caused to preponderate over pressure of fluid in chamber 4 to actuate the diaphragm-follower assemblage in the direction of said chamber 4. By virtue of the sealing and frictional contact of the diaphragm fold 16 with cylinder wall 7 and follower surface 21 as maintained by action of ring 22 in the trough of said fold, the integrity of said fold is maintained and its collapse prevented, apparently due to the fact that such sealing contact prevents fluid under pressure from chamber 3 from reaching the outer surfaces of the spaced-apart layers of said fold, and also due to the fact that such frictional contact prevents axialwise sliding movement of said fold on surfaces 7 and 21.

At the same time, movement of diaphragm follower members 11 and 12 in the direction of chamber 4 transpires as a result of the preponderant pressure in chamber 3 as the diaphragm fold 16 becomes elongated in the direction of said chamber 4 and the ring 22 rolls on the inner surface of said fold.

According to a feature of the invention, the shoulder 9 is so located with respect to travel of the diaphragm-follower assemblage 2, that during normal functioning of the ring 22 within fold 16, said ring will just make contact with said shoulder while remaining in contact with the inner rounded surface of said fold when said assemblage assumes its limit position, in which it is shown in Fig. 2, defined by contact of follower member 11 with casing shoulder 20, so as not to interfere with travel of the assemblage during normal functioning. The purpose, however, of the shoulder 9 is to gather and retain the ring 22 during travel of the diaphragm-follower assemblage 2 in the direction of chamber 4 should said ring become misaligned axialwise with respect to the trough portion of the fold while rolling therein, and to reassert said ring in proper position in said trough when said assemblage assumes its respective limit position.

From the position in which it is shown in Fig. 2, the diaphragm-follower assemblage 2 may be made to assume an opposite limit position in which it is shown in Fig. 3 by causing pressure of fluid in chamber 4 to preponderate over pressure of fluid in chamber 3. During travel of such assemblage, pressure of fluid in the chamber 4, being exposed to the interior of the diaphragm fold 16 will act to maintain its integrity as same elongates in the direction of chamber 3, while the ring 22 in rolling within said fold follows the curved portion thereof at the junction of its layers to assume a position of utility to prevent collapse of said fold when pressure of fluid in chamber 3 again predominates to cause movement of the diaphragm-follower assemblage in the direction of chamber 4 as previously described.

From the foregoing it will be apparent that in the embodiment of the invention shown in Figs. 1, 2 and 3, since the ring 22 is unattached to the diaphragm fold 16, said fold may be made as long as desired and the ring 22 will function as above to prevent its collapse by turning within itself as many revolutions as necessary to allow for full extension of such a long travel fold.

It will also be apparent from the foregoing that the ring 22 need not necessarily be made of resilient material but must be capable of being easily turned within itself and might take the form of a helical coil spring such as shown in Fig. 4.

Also, according to another embodiment of the invention as shown in Fig. 5, the ring 22 may be suitably attached along a line about its periphery to the diaphragm fold 16 to provide means for positive assurance that said ring will remain in proper location within said fold in its curved directional transition region. In such embodiment however, it will be apparent that the travel of the diaphragm employing such attached ring would be limited to the axial distance which said ring is free to roll within the diaphragm fold as limited by rotation of its line of attachment to an innermost peripheral position on the layer of diaphragm fold radially supported by follower member 12.

*Summary*

From the foregoing it will be apparent that I have provided means for preventing collapse of the travel fold in a long-travel diaphragm which makes possible reliable and trouble-free use of a relatively simple single-fold long-travel diaphragm in a double-acting actuator device.

Having now described the invention, what I claim as new and desire to secure by Letters Patent, is:

1. An actuator device comprising a hollow casing having a cylinder wall formed therein, a diaphragm follower having a cylindrical surface extending in spaced-apart parallel relationship with said cylinder wall to define the peripheral walls of an annular elongated clearance space therebetween, an annular flexible diaphragm in sealed coaxial attachment at its outer and inner peripheral edges with said casing and said follower, respectively, and having extending between said edges a single annular fold disposed in said clearance space, and a flexible ring of substantially circular cross-section disposed coaxially in said fold in compressive rolling engagement at its inner and outer peripheries with respective spaced-apart layers of said fold.

2. The combination as set forth in claim 1, including ring retention means attached to said casing projecting radially inward from said cylinder wall into intersection with the path of rolling travel of said ring for engagement therewith when axially misaligned about its circumference.

3. The combination as set forth in claim 2, including follower stop means attached to said casing defining a limit position for travel of said follower in the direction causing movement of said ring toward said ring retention means, said follower stop means being located relative to said ring retention means so that said follower may attain its said limit position without causing any material compression of said ring between said apex of said fold and said retention means and therefore any excessive axial pull on said diaphragm.

4. The combination as set forth in claim 1, in which a portion of the peripheral surface of said ring is attached about its circumference coaxially to said fold in which same is disposed.

5. The combination as set forth in claim 1, in which said ring is composed of resilient material in equal degrees of circumferential wise tension and compression at its outer and inner peripheries, respectively.

6. The combination as set forth in claim 1, in which said diaphragm is composed at least in part of resilient material affording a certain degree of compressibility, and said ring is in the form of a tight-wound wire coil spring.

References Cited in the file of this patent
UNITED STATES PATENTS

| | | |
|---|---|---|
| 691,190 | Sharp | Jan. 14, 1902 |
| 1,661,131 | Duffield | Feb. 23, 1928 |
| 2,180,128 | Stancliffe | Nov. 14, 1939 |